United States Patent Office 3,457,280
Patented July 22, 1969

3,457,280
α-GLYCOLIDE AND METHODS FOR THE
ISOLATION THEREOF
Edward Emil Schmitt and Martin Epstein, Norwalk,
Conn., and Rocco Albert Polistina, Port Chester,
N.Y., assignors to American Cyanamid Company,
Stamford, Conn., a corporation of Maine
No Drawing. Continuation-in-part of application Ser. No.
484,110, Aug. 31, 1965. This application June 12, 1967,
Ser. No. 645,502
Int. Cl. C07d 15/16; C08g 17/17
U.S. Cl. 260—340.2                                 9 Claims

ABSTRACT OF THE DISCLOSURE

An isomeric form of substantially pure glycolide designated as α-glycolide and characterized by (1) its ability to be polymerized reproducibly to a uniform molecular weight polymer in spite of contact with atmospheric moisture, (2) definitive infrared spectral lines, and (3) certain other distinctive physical properties, e.g., refractive indices, crystal form, and optic axial angle. Isolation by controlled solvent saturation and solid state conversion.

CROSS REFERENCES TO RELATED APPLICATIONS

The present application is a continuation-in-part of our application Ser. No. 484,110, filed Aug. 31, 1965 and now abandoned.

BACKGROUND OF THE INVENTION

The present invention is in the field of glycolides which are obtainable by the condensation of glycolic acid and in the polymerization behavior exhibited thereby.

The closest known prior art is that contained in United States Patent No. 2676,945, Higgins, which relates to a process for producing polyhydroxyacetic ester condensates of hydroxy acetic acid and United States Patent No. 2,668,162, Lowe, which relates to a process for producing polyhydroxy acetic esters from glycolide. The problem of producing reproducible polymers from glycolide that has been exposed to atmospheric moisture is indicated in the latter cited reference and need for dry glycolide is emphasized.

As pointed out in U.S. Patent No. 2,585,427, hydroxyacetic acid, also known as glycolic acid, is capable of various condensation reactions, involving elimination of water, to form a variety of products. Two molecules may condense with the elimination of two molecules of water to produce glycolide, a six-membered ring of the formula $C_4H_4O_4$ and structure

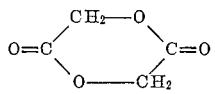

In other condensation reactions under the influence of heat, vacuum and catalyst, polyhydroxyacetic ester condensates of hydroxy acetic acid of the general formula

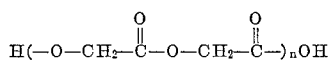

wherein $n$ represents a large integer characterizing a polymer, are produced. In these latter reactions, a large proportion of glycolide is produced as a by-product of the reaction. The glycolides formed by condensation may be chemically purified and recovered by crystallization from ethyl acetate. In any case, the product obtained may be characterized as being chemically pure but not isomerically pure, the latter discovery being a part of the present invention.

By "chemically pure" is meant the virtual exclusion of substances other than glycolides of formula $C_4H_4O_4$. By "isomerically pure" is meant the presence of one specific isomeric form to the virtual exclusion of others.

A process for the polymerization of chemically pure and dry glycolide composition is disclosed in U.S. Patent No. 2,668,162 and involves heating said glycolide composition in a closed reaction vessel in an atmosphere of nitrogen and in the presence of antimony trioxide or antimony trihalide. Under such conditions, polymers having melt viscosities up to 50,000 poises are obtainable. However, when the glycolide is not dry, polymers having melt viscosities less than 400 poises are generally obtained. For extrusion of the polymers formed into fibers and films, the melt viscosities must be at least 400 and not greater than 27,000 poises when measured at 245° C., which temperature is associated with the previous viscosities given.

In carrying out the process of the cited Lowe patent in polymerizing glycolide as obtained by the condensation reactions it has been found that the term "dry" has the very limited and specific meaning of "anhydrous" with respect to polymerization behaviour. Unless every effort is made to maintain the glycolide composition normally obtained in the anhydrous condition from the point of manufacture to the point of use, problems in reproducibility of molecular weight of the polymer formed are experienced such as to render the glycolide supply valueless in producing the desired products. Even where the glycolide supply has been maintained under conditions designed to maintain it anhydrous, periodic sampling of the supply can introduce sufficient moisture into the storage environment because of the hygroscopicity of the normal glycolide to impair its ability to reproducibly form polymers of the desired molecular weight. Thus, if the glycolide normally produced could be readily converted into a form which was relatively moisture-insensitive and could be reproducibly polymerized into polymers of consistent molecular weight, a long-felt need would be fulfilled.

SUMMARY OF THE INVENTION

This invention relates to the isomerization of glycolide compositions containing at least some β-glycolide, and to methods for the isolation of one of the isomers thereof, namely, α-glycolide, in substantially pure form. More particularly, it relates to a relatively moisture-insensitive α-glycolide, capable of being catalytically polymerized reproducibly to a consistent molecular weight polymer in spite of contact with atmospheric moisture and to novel processes for isolating α-glycolide from a glycolide composition containing at least some of its companion isomer, β-glycolide, the latter isomer being the subject of our companion application Ser. No. 484,111, filed Aug. 31, 1965 and now abandoned.

It is an object of the present invention to provide an isomerically pure α-glycolide which, when exposed to an environment containing atmospheric moisture and polymerized catalytically, consistently affords a uniform molecular weight polymer. It is a further object of the present invention to provide processes by which the desired isomerically pure α-glycolide is isolated. These and other objects of the present invention will become apparent from a consideration of the ensuing description.

It has now been discovered that the glycolide prepared in accordance with the method described in the aforementioned identified patents does not, in fact, constitute a single substance, but rather comprises a composition containing at least two distinct isolatable isomers as designated by the α and β notation. Unexpectedly, it has also been discovered that the latter mixture can readily be converted to one isomeric form, namely, the relatively moisture-insensitive α-isomer, by employing selective processes therefor. It is also found, quite unexpectedly, that the substantially pure α-isomer can be obtained from the substantially pure β-isomer as well. In the companion application previously cited, the β-isomer is disclosed as well as methods of obtaining it from isomeric mixtures of glycolide or from the substantially pure α-isomer. It is, of course, possible to prepare isomeric mixtures as in the past by failing to observe certain restrictions in the processes given here and in the companion application, but such development does not advance the technology with respect to the glycolides.

The α-glycolide of the present invention may be characterized as being relatively insensitive to atmospheric moisture in that it can be exposed thereto for considerable time periods without significant effect upon its ability to reproducibly form uniform molecular weight polymers within the useful range previously cited. It may be further characterized in having infrared spectral bands as follows: doublet carbonyl bands at 1772 and 1750 cm.$^{-1}$ and another distinctive band at 1402 cm.$^{-1}$ and the absence of bands at 1455 and between 1240 and 1060 cm.$^{-1}$, since the latter bands are characteristic of the β-isomer. To characterize the α-isomer further, the following properties are offered:

usual crystal habit: thin flakes, orthorhombic system
refractive indices: (relative to Na D-line at 25° C.)

$\alpha = 1.486$
$\beta = 1.506$
$\gamma = 1.620$ optic axial angle $2V = 47°40'$.

In connection with the refractive indices given above, it is to be understood all three values are associated with α-glycolide, the use of Greek alphabet characters to designate isomers as well as refractive indices of a specific isomer being common but confusing practice. Thus, there are three refractive indices associated with β-glycolide having similar designation but differing in value. Also, the values of the properties given above for α-glycolide are sufficiently different from the values of the corresponding properties of β-glycolide as to clearly distinguish the two isomers from one another as well as to indicate when mixtures are involved.

In accordance with the present invention, in addition to the distinctive characterization of the α-isomer of glycolide, previously unknown as a separate entity, there are furnished two processes by which α-glycolide as a separate entity in substantially pure form can be obtained, depending upon whether (1) both chemical and isomeric purification are to be simultaneously accomplished or (2) isomeric purification to the α-glycolide form is solely desired in an already chemically pure glycolide source. It is to be understood that process (2) as indicated above can never be used to effect chemical purification but that process (1) may be used solely to effect isomeric purification when the source of glycolide is already chemically pure. By "glycolide source" is meant a glycolide composition which contains at least some β-glycolide or is substantially pure β-glycolide.

According to the process wherein both chemical and isomeric purification may be simultaneously effected as indicated by process (1) above, it has been found that when the source glycolide is dissolved in a solvent of suitable solvating capacity, selective recrystallization can be effected, affording substantially pure α-glycolide isomer. A preferred procedure involves dissolving the source glycolide in isopropyl alcohol such that the solvent is saturated with respect to glycolide at a temperature between about 60 and 80° C., filtering the solution while in the temperature range indicated so as to remove undissolved glycolide and/or impurities, allowing crystallization to occur in the temperature range of about 45 to 60° C., filtering the mother liquor from the crystals while at a temperature above about 42° C., washing with a non-solvent for the glycolide to remove solvent originally employed, and subsequently drying the crystals formed. The product obtained is substantially pure α-glycolide in yields ranging from about 35 to 95% based on the amount of glycolide source. The α-glycolide so prepared is distinguished by its relative water-insensitivity with regard to polymerization behavior. Thus, α-glycolide affords the same molecular weight polymer when stored a number of hours in the presence of atmospheric moisture as that produced only when every effort has been made to maintain it in the anhydrous state. On the other hand, an isomeric mixture of glycolides, as conventionally prepared, when exposed to atmospheric moisture for several hours produces a polymer of much lower molecular weight than that produced from the same glycolide source that has been carefully maintained in the anhydrous state.

Any number of solvents are useful in the process described above as long as they have reasonable solvating power for glycolide and are essentially unreactive with glycolide. The important aspect of the solvent in the process is the manner in which it is employed rather than its particular generic identity. The specific manner of utility of the solvent in the process is such that it is saturated with glycolide at a temperature sufficiently in excess of about 42° C. so that by careful cooling of the saturated solution to a temperature somewhat below the saturation temperature and above about 42° C. essentially all of the glycolide that is to precipitate from the solution in the temperature range indicated is recoverable without contamination by precipitate forming below this range. There are certain solvents that show geometric increases in solvating power for glycolide with increasing temperature and these solvents are particularly useful in the process of selective recrystallization.

It is difficult to class the solvents that are useful into a single generic category since they include such diverse members as benzene, isopropanol, and cyclohexan-1,4-diol, among others. It is generally found that solvents containing hydroxyl groups as the only functional groups are effective as long as they additionally meet the following restrictions: acyclic aliphatic monohydric alcohols containing more than two carbon atoms, di- or polyhydric aliphatic alcohols containing two or more carbon atoms as well as ethers thereof with similar di- or polyhydric alcohols, cycloaliphatic alcohols in which the hydroxyl group is attached to a ring member, aromatic alcohols, and phenols. Illustrative solvents in addition to those previously named are, for example, n-propanol, n-butanol, isobutanol, tertiary butanol, isoamyl alcohol, n-pentanol, hexanol, ethylene glycol, diethylene glycol, triethylene glycol, cyclopentanol, cyclohexanol, benzyl alcohol, cresol, toluene, etc. as well as appropriate mixtures thereof.

Another critical aspect of the solvent usage is the ratio of solute to solvent. It is essential that the solvent usage be sufficient to insure that precipitation of glycolide does not occur below about 42° C. In general, from about one to twenty parts (by volume) of the selected solvent per part by weight of the glycolide source are employed to effect satisfactory recrystallization of the substantially isometrically pure α-glycolide, hitherto unknown as a separate substance. The use, of course, will depend upon the particular solvent employed. Although partial solution of the glycolide source may be effected at or near room temperature, it is important that saturation of the solvent with glycolide be sufficiently in excess of 42° C. and preferably below the melting point of glycolide to effect precipitation of the substantially pure α-glycolide to the exclusion of its isomer, β-glycolide. It is greatly preferred if saturation is achieved at a temperature in the range of about 60 to 80° C. in order to provide a more practical range within which crystallization and isolation of α-glycolide can occur. On subsequent cooling of the solution to above about 42° C. and isolation of the crystals within the temperature range indicated, followed by washing with a non-solvent for glycolide and drying to remove the non-solvent, substantially pure α-glycolide is obtained.

The substantially pure α-glycolide thus formed, in addition to characterization by its physical properties as previously indicated, exhibits a consistent polymerization behavior, so that predictably uniform molecular weight polymers can be routinely prepared from said isomer in spite of exposure to atmospheric moisture.

The transition point of glycolide is about 42° C. and is such that above this temperature the α-isomer is the thermodynamically stable form, while below, it the β-isomer is the thermodynamically stable form. Generally, the isomer formed upon crystallization will be the form thermodynamically stable at the temperature of formation. However, due to certain anomalous behaviour associated with certain solvents or the presence of undetected seeds of the thermodynamically unstable isomer previously formed at appropriate temperature, it is also possible in certain instances that the desired isomeric form of glycolide will appear to be obtained at temperatures which violate the transition point. In those instances where both isomeric forms of glycolide will crystallize from solution, it is necessary to maintain the crystallizing solution above the transition point to obtain the substantially pure α-isomer. It is also necessary to isolate the formed crystals in a manner which will avoid subsequent contamination with undesired isomer.

The melting point of glycolide is between about 82 and 84.5° C., depending upon the chemical purity thereof. Liquid glycolide is presumed to be a mixture of isomeric forms. Thus, if the glycolide is precipitated out of the solvent above its melting point, is will exist as an oily liquid without distinguishable form. The liquid which forms is capable of extensive super-cooling without formation of a solid form. The presence of the oily liquid can interfere with chemical purification. The avoidance of melting of the glycolide, therefore, is greatly to be preferred where chemical purity of the glycolide is essential.

As alternative process for the preparation of substantially pure α-glycolide from a glycolide source already chemically pure involves a solid-state conversion. In such process, the glycolide source in solid form is heated to a temperature above about 42° C. but below the melting point of the glycolide and the conversion is effected. The conversion to the α-isomeric form of glycolide is essentially complete when the desired temperature is reached and no prolonged heating is necessary. While heating to temperatures considerably higher than about 42° C. within the range specified are possible, no special benefits accrue as a result thereof. After conversion is complete, the α-glycolide thus formed may be cooled to below 42° C., if desired, without alteration of the product.

While in the foregoing description of the present invention the terms "isomerism," "isomeric," and "isomers" have been employed, it is possible that other terminology is appropriate. Thus, the terms "polymorphism," "polymorphic," and "polymorphs" may be considered appropriate based on the showings made. However, additional information not pertinent to the invention described herein gives rise to strong support for the existence of conformational isomers. Conformational isomers may be defined as having the same atomic composition and atomic bonds within the molecule, but differing with respect to the relative position of atoms and shape resulting from such arrangement. They can be likened to the differences in the "boat" and "chair" forms of cyclohexane. However, although energy differences between the two conformations of cyclohexane are not such as to give rise to separate isomers which can be isolated, in the present case, as in others, a suitable energy condition exists so as to enable the isolation of the separate isomers. While the explanation given above for the choice of the terminology is thought to be accurate, it is to be understood that the invention thus described is not limited by the accuracy of the terminology by which it is described.

As pointed out in the cited reference patent, U.S. 2,668,162, polymers obtained from glycolide that have melt viscosities at 245° C. in the range of 400 to 27,000 poises are suitable for extrusion into films or filaments. Polymers from α-glycolide are readily obtainable with melt viscosities within this range. α-Glycolide offers the advantage over the previously known mixture of isomers of being capable of catalytic polymerization reproducible to a consistent molecular weight polymer in spite of contact with atmospheric moisture, said molecular weight being related to the melt viscosity determined. Thus, α-glycolide not only permits melt viscosities in excess of 400 poises at 245° C. to be obtained when exposed to a moisture environment which can cause the isomeric mixture of glycolides to result in melt viscosities below 400 poises, under the same conditions of polymerization, but can also permit polymers to be routinely and reproducibly obtained in spite of an exposure to a sufficient atmospheric moisture which considerably limits the molecular weight polymer available with the mixture of isomers.

In order that the concept of the present invention may be more fully understood, the following examples are set forth. These examples are set forth primarily for the purpose of illustration and any specific enumeration of detail contained therein should not be interpreted as a limitation on the case except as is indicated in the appended claims.

Example 1

This example illustrates the conventional preparation of a mixture of α- and β-glycolide isomers.

Into a suitable vessel are added 400 parts of commercial glycolic acid which is heated to 170–180° C. at atmospheric pressure to distill off water. The pressure is then slowly reduced to the equivalent of 5 mm. of Hg, maintained at the temperature indicated until water ceases to distill. The resultant mixture is allowed to cool, recovered, and ground into powder. About 280 parts of the latter are slowly added to a flask purged with nitrogen and held at a pressure below the equivalent of 15 mm. of Hg and at a temperature from about 250–285° C. 250 parts of the resultant distillate are next dissolved in approximately twice its weight of ethyl acetate at the boiling point; decolorizing charcoal is added; and reflux continued for ½ hour. The solution is filtered while hot; cooled; and white glycolide crystals are obtained on filtering and drying. The recrystallization is repeated twice in like manner except that the decolorizing charcoal is omitted. There is obtained 160 parts of an isomeric mixture of glycolides having a melting point of 83.8–84.3° C.

The product is characterized by distinctive infrared spectral bands at the following wavelengths: 1795, 1772, 1765, 1750, 1455, 1402, 1210, and 1080 cm.$^{-1}$. Elemental analyses and molecular determination are consistent with a chemically pure glycolide. No consistent values for refractive indices, crystal habit, or optic axial angle are obtained.

Example 2

In a suitable vessel are dissolved 100 parts of glycolide as prepared in Example 1 above in 1650 parts by volume) of isopropyl alcohol at a temperature of 80° C. The hot solution is filtered through activated charcoal. While cooling to about 42° C., white crystals precipitate out of solution. The crystals are filtered and washed with ether to yield 50 parts of α-glycolide which possesses an infrared spectrum as follows: doublet carbonyl bands at 1772 and 1750 cm.$^{-1}$ and another distinctive band at 1402 cm.$^{-1}$ and the absence of bands at 1455 cm.$^{-1}$ and between 1240 and 1060 cm.$^{-1}$. The crystals are obtained as thin flakes in the orthorhombic system. The crystals have the following refractive indices (relative to Na D-line at 25° C.):

$$\alpha = 1.486$$
$$\beta = 1.506$$
$$\gamma = 1.620$$

The crystals have an optic axial angle $2V=+47°40'$. A molecular weight determination in acetonitrile affords an actual value of 115 as compared with a theoretical value of 116. Upon an elemental carbon and hydrogen analysis, the following in percentages are recorded:

Calculated for $C_4H_4O_4$: C, 41.39; H, 3.47. Found: C, 41.42; H, 3.55.

Examples 3–11

In the following examples, several selective solvents are employed in lieu of isopropanol, repeating the procedure of Example 2 in every material detail to effect the crystallization of α-glycolide from a mixture of glycolide isomers. It will be noted that the yield of α-glycolide obtained as set forth in the table below varies with respect to the amount and kind of particular solvent employed.

TABLE

| Ex. | Parts of isomeric glycolide prepared in Example 1 | Parts and solvent (by volume) | Yield of α-glycolide in percent |
|---|---|---|---|
| 3 | 100 | 800 n-propanol | 52 |
| 4 | 80 | 1,000 n-butanol | 46 |
| 5 | 100 | 1,500 n-pentanol | 58 |
| 6 | 75 | 1,200 benzyl alcohol | 36 |
| 7 | 100 | 1,800 isobutanol | 61 |
| 8 | 100 | 2,000 benzene | 58 |
| 9 | 100 | 200 ethylene glycol | 60 |
| 10 | 100 | 200 cyclohexanol | 65 |
| 11 | 100 | 1,100 t-butanol | 76.5 |

Example 12

This example illustrates the recrystallization of α- and β-glycolide from an isomeric mixture of glycolides.

Into a suitable reaction vessel are added 100 parts of glycolide as prepared in Example 1 above and the latter mixture is dissolved in 500 parts of methanol by volume containing 25 parts of activated charcoal. The resultant mixture is heated to a temperature of 50° C. The heated mixture is filtered hot, then cooled, filtered again, and washed with ether to yield 60 parts of glycolide which has the same infrared spectrum exhibited by the glycolide prior to treatment with methanol indicating a mixture of isomers. Crystallization in the present example occurs both above and below 42° C.

Substituting recrystallization solvents, such as ethyl alcohol, chloroform, tetrahydrofuran, tetrahydrofurfuryl alcohol, ethyl acetate, acetone, acetonitrile, acetic anhydride, or benzene for the methanol solvent above, a mixture of α- and β-glycolides is obtained and identified as in Example 1.

Example 13

This example illustrates the polymerization of substantially pure α-glycolide.

A small amount of antimony trifluoride (0.03% on the weight of the glycolide) is added to a suitable vessel containing 76 parts of a α-glycolide as prepared in Example 2. Argon is then passed over the surface of the mixture which is heated to 195° C. After 10 minutes, the viscosity increased so markedly that no mechanical stirring is possible. The temperature is raised to 230° C. during a 20 minute period and is maintained for 30 minutes. After cooling, the resulting solid polymer is pulverized, dried, and found to have a melt viscosity between 20,000 and 22,000 poises at 245° C.

Repeating the above in every material detail except that the polymerization procedure is carried out utilizing α-glycolide which had been exposed to normal atmospheric moisture (50% relative humidity and 23° C.) for six hours, a polymer having a similar melt viscosity is obtained.

Example 14

This example illustrates the polymerization of a mixture of α- and β-glycolides as conventionally prepared in Example 1 above.

Antimony trifluoride (0.03% by weight based on the weight of the glycolide) is added to 72 parts of conventionally prepared glycolide. Argon is allowed to pass over the surface of the material which is heated to 195° C. The contents are stirred for one hour at that temperature and then maintained at the same temperature for an additional hour without stirring. The temperature is quickly raised to 230° C. for an additional ½ hour. After solidification, the resulting polymer is pulverized, dried, and found to have a melt viscosity of 7,000 poises at 245° C.

When the isomeric mixture is exposed to atmospheric moisture as in Example 13 for short time periods, the melt viscosity obtainable in the polymer is reduced from that indicated above. An exposure of two hours results in less than half the viscosity indicated.

Example 15

This example shows the preparation of β-glycolide in accordance with the process of our companion application Ser. No. 484,111, filed Aug. 31, 1965 and now abandoned, for use in the preparation of α-glycolide in the subsequent examples.

100 parts of a mixture of α- and β-glycolide as prepared in Example 1 above are placed in a suitable reactor and 450 parts (by volume) of cyclohexanone are added. The mixture is heated to 85° C. to achieve solution. The solution is then slowly cooled with stirring to a temperature below 32° C. without the formation of precipitate. Continued cooling to 0° C. results in the formation of 35 parts of precipitate which is collected and dried and shown by its infrared spectrum to be substantially pure β-glycolide. Cooling the filtrate to −40° C. results in an additional 28 parts of substantially pure β-glycolide.

The β-glycolide produced is characterized by infrared spectral bands as follows: doublet carbonyl bands at 1795 and 1765 cm.$^{-1}$, additional distinctive bands at 1455, 1210 and 1080 cm.$^{-1}$, and the absence of any band at 1402 cm.$^{-1}$, since the latter is characteristic of the α-isomer. To characterize the β-isomer further, the following properties are offered:

Crystal habit: massive particles, monoclinic system refractive indices (relative to Na D–line at 25° C.):
$\alpha = 1.430$
$\beta = 1.552$
$\gamma = 1.568$
Optic axial angle $2V = -37°20'$.

Example 16

This example shows the preparation of substantially pure α-glycolide from the substantially pure β-glycolide produced by the process of Example 15.

100 parts of β-glycolide (from Example 15) are placed in 1000 parts of anhydrous benzene and the mixture refluxed. The solution which results is slowly cooled with stirring to 43° C., at which point the resulting precipitate is quickly filtered through a preheated funnel to maintain the temperature at 43° C. The crystalline product (40 parts) is found by its infrared spectrum to be substantially pure α-glycolide. Other physical properties also confirm its identity. The filtrate can be concentrated to 500 parts by distilling the solvent. Upon cooling the concentrate slowly to 43° C. and filtering the warm solution, another 24 parts of substantially pure α-glycolide may be obtained.

Example 17

This example shows the preparation of isomerically pure α-glycolide from a mixture of isomers by heating the mixture in solid form above 42° C.

50 parts of an isomeric mixture of glycolides as prepared in Example 1 are ground into a powder and placed in a round-bottomed flask through which a stream of argon is passed. The flask is immersed in a heating bath at 45° C. and kept there for 15 minutes after the contents have reached 45° C. to form substantially pure α- glycolide. The material is removed from the bath, cooled to room temperature, and is shown by its infrared spectrum and other physical properties to be isomerically pure α-glycolide.

Example 18

This example shows the preparation of isomerically pure α-glycolide from isomerically pure β-glycolide.

The procedure of Example 17 was followed in every material detail except that the β-glycolide of Example 15 was employed in place of the glycolide source therein. The product obtained was shown by its infrared spectrum and other physical properties to be isomerically pure α-glycolide.

We claim:

1. Substantially chemically and isomerically pure α-glycolide characterized by an infrared spectrum containing doublet carbonyl bands at 1772 and 1750 cm.$^{-1}$ and another distinctive band at 1402 cm.$^{-1}$ and the absence of any bands at 1455 and between 1240 and 1060 cm.$^{-1}$ by a crystal habit when crystallized of thin flakes in the orthorhombic system, by refractive indices of $\alpha=1.486$, $\beta=1.506$, and $\gamma=1.620$, by an optic axial angle of $2V=+47°40'$, and by its ability to form polymers of consistent molecular weight even when exposed to atmospheric moisture.

2. A process for preparing substantially pure α-glycolide from a substantially chemically pure glycolide composition containing at least some β-isomer which comprises dissolving said glycolide composition in an inert solvent which is capable of saturation with respect to glycolide above about 42° C. and below the melting point of glycolide, effecting crystallization in said temperature range, and recovering the formed crystals of substantially chemically and isomerically pure α-glycolide characterized by an infrared spectrum containing doublet carbonyl bands at 1772 and 1750 cm.$^{-1}$ and another distinctive band at 1402 cm.$^{-1}$ and the absence of any bands at 1455 and between 1240 and 1060 cm.$^{-1}$ by a crystal habit when crystallized of thin flakes in the orthorhombic system, by refractive indices of $\alpha=1.486$, $\beta=1.506$, and $\gamma=1.620$, by an optic axial angle of $2V=+47°40'$, and by its ability to form polymers of consistent molecular weight even when exposed to atmospheric moisture, wherein the solvent and glycolide to be treated are present in amounts ranging from 1 to about 20 parts of solvent per part of glycolide.

3. A process according to claim 2, wherein the solvent is isopropyl alcohol.

4. A process according to claim 2, wherein the solvent is isobutanol.

5. A process according to claim 2, wherein the glycolide composition consists of an isomeric mixture of α- and β-glycolides.

6. A process according to claim 2, wherein the glycolide composition is substantially pure β-glycolide.

7. A process for preparing isomerically pure α-glycolide from a substantially chemically pure glycolide composition which contains at least some β-glycolide which comprises heating said glycolide composition above about 42° C. but below the melting point of said glycolide composition cooling to room temperature and recovering substantially chemically and isomerically pure α-glycolide characterized by an infrared spectrum containing doublet carbonyl bands at 1772 and 1750 cm.$^{-1}$ and another distinctive band at 1402 cm.$^{-1}$ and the absence of any bands at 1455 and between 1240 and 1060 cm.$^{-1}$ by a crystal habit when crystallized of thin flakes in the orthorhombic system, by refractive indices of $\alpha=1.486$, $\beta=1.506$, and $\gamma=1.620$, by an optic axial angle of $2V=+47°40'$, and by its ability to form polymers of consistent molecular weight even when exposed to atmospheric moisture.

8. A process according to claim 7, wherein the glycolide composition consists of an isomeric mixture of α- and β-glycolide.

9. A process according to claim 7 wherein the glycolide composition is substantially pure β-glycolide.

References Cited

UNITED STATES PATENTS 2,668,162  2/1954  Lowe _____ 260—340.2 X

NORMA S. MILESTONE, Primary Examiner

U.S. Cl. X.R.

260—78.3